Jan. 31, 1967    R. M. DE LARA    3,301,102
TOOL GUIDE-LOCATOR
Filed July 1, 1964    2 Sheets-Sheet 1
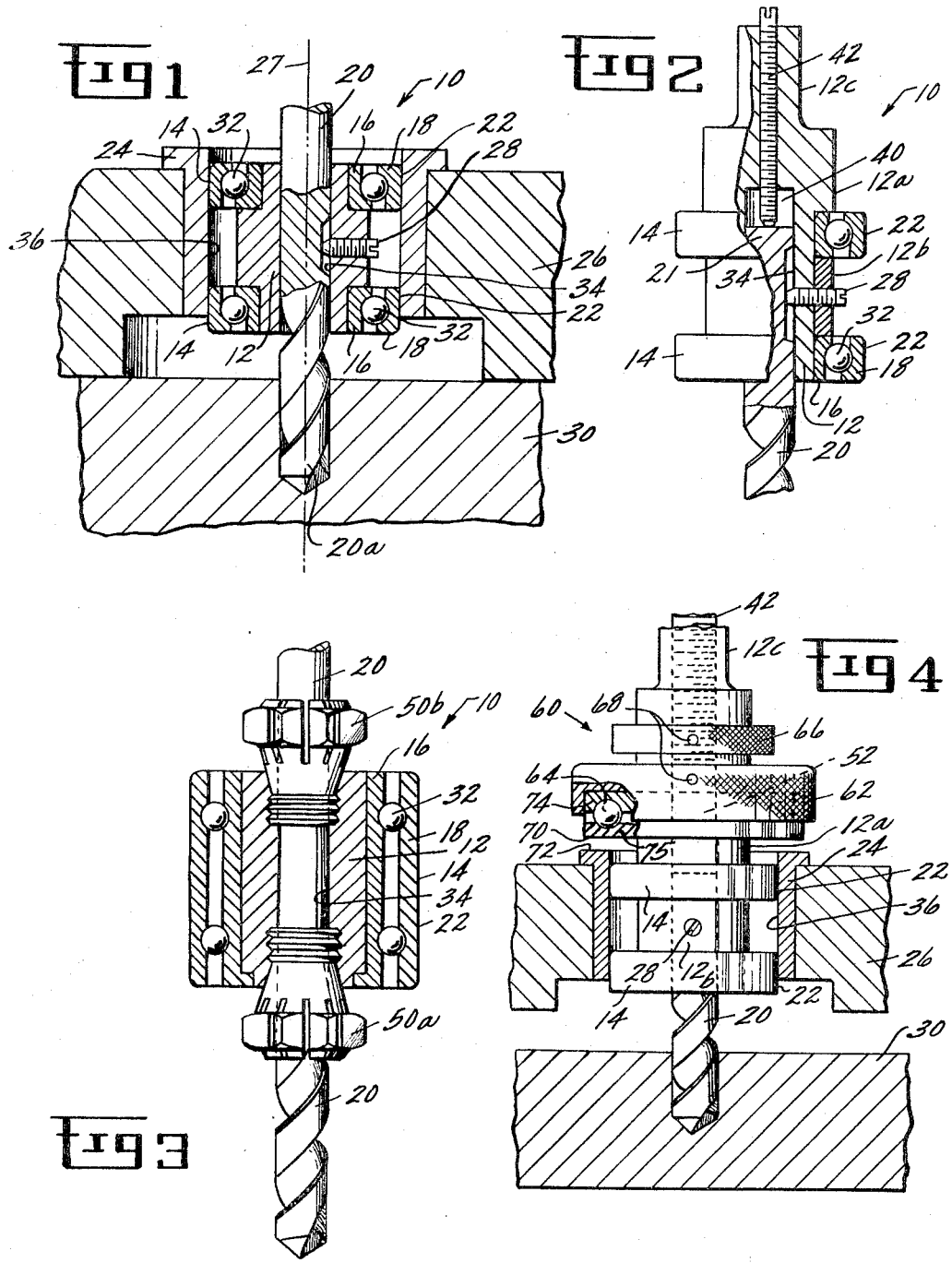
INVENTOR.
ROBERT M. DE LARA
BY
ATTORNEY

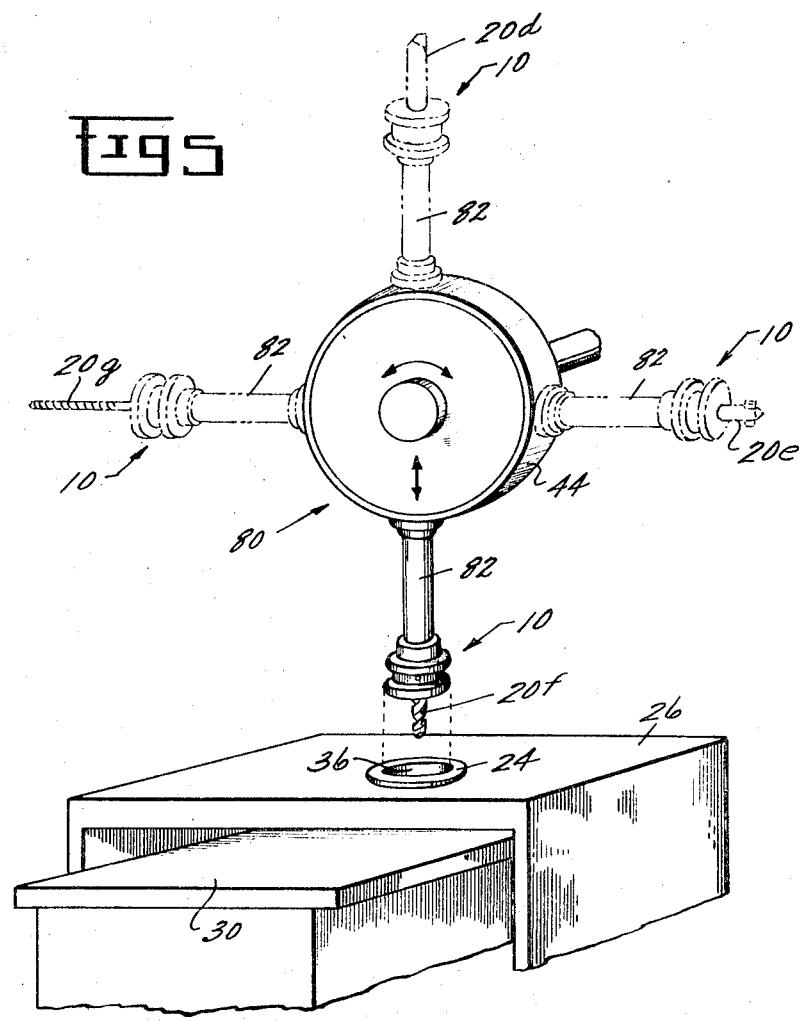

United States Patent Office 3,301,102
Patented Jan. 31, 1967

3,301,102
TOOL GUIDE-LOCATOR
Robert Malcolm de Lara, Lynn, Mass., assignor to General Electric Company, a corporation of New York
Filed July 1, 1964, Ser. No. 379,604
10 Claims. (Cl. 77—55)

This invention relates to a tool guide-locator which also can function as a supplementary spindle for a rotary machine tool. More particularly it relates to an anti-friction type guide-locator for rotary tools or tools performing rotary material removal.

It has long been a practice in the art of using rotary tools such as drills, end mills, trepanning tools and the like in rotary machine tools such as drilling machines, lathes and milling machines, to employ a jig, a fixture plate or a templet in which guide holes have been placed to repeatedly position the tool for duplicate production work. In the past such holes were provided with solid liner bushings to decrease fixture wear and for accuracy of tool location. Because various sizes of tools might be inserted through the hole or holes in the jig or fixture plate, bushing inserts, sometimes referred to as slip renewable bushings, were secured to the jig or fixture inside the liner bushing. For articles requiring a plurality of holes accurately located in the single article, a fixture plate with a plurality of holes, bushings, etc. were required.

It was recognized that the continual penetration of a rotary tool through the central bore of a slip renewable or other bushing mounted with the fixture plate caused the bushing to wear and become "chewed" through abrasion with the tool eventually leading to inaccurate tool guiding. In addition, the tool itself tended to wear more quickly because of its contact with the bushing. Vibration of the tool because of unbalance or inaccuracy, such as due to wear in a rotary machine tool spindle carrying the tool, added to the amount of wear and chipping. Subsequently, guide bushings having rotatable inner members were developed so that as the rotary tool contacted the bushings, the inner member would begin to rotate. This then was intended to reduce the wear on the tool and also was intended to lend more accuracy to the operation. However, the entry of the tool into the bushing, even though it included a rotary inner member, continued to cause significant wear on the tool and on the bushing's inner member as well because of tool or machine vibration and the mere rotating contact with the tool.

Various attempts have been made to stop the relative motion between the rotary tool and the guide bushing at the earliest possible time. One example of this approach is shown in U.S. Patent 2,881,644 which shows an anti-friction tool guiding means, typical of the art, secured to a jig or fixture plate. Although this may have relieved some of the wear problems, wear and vibration damage was not eliminated and an individual guiding means was required for each of a plurality of holes to be made in an article. Furthermore, prior arrangements did not adequately correct for sloppiness in the machine tool spindle because tool tolerances generally are not sufficiently accurate to provide the required fit.

With the increased use of the expensive carbide rotary tools, the problem of tool wear and tool chipping has become extremely critical. Relatively long lengths presently are required in production because tools (1) must have a portion to be held in a rotating means such as a spindle, (2) must provide a portion to cooperate with a guide bushing and (3) must include a portion for removing metal such as in drilling. Vibration in longer tools is more difficult to control, so that as the tool enters a guiding means located in the jig or fixture plate, unusual wear and chipping results. Thus the useful life of these relatively brittle, more costly carbide tools has been significantly shortened to the point where the use of carbide tools has been curtailed in some applications.

It is a principal object of the present invention to provide, for a tool used for rotary metal removal, a tool guide-locator secured with the tool prior to, during and after operation in order to eliminate wear between the tool and any locating and guiding means.

Another object is to provide, for a rotary tool, a tool guide-locator carried by the tool and designed such that the cutting portion of the tool abrades, cuts or is in any friction contact only with the workpiece and not with any portion of the tool guide-locator.

Still another object is to provide, for a rotary tool, a single tool guide-locator which can be used with a plurality of fixture mounted simple guide bushings to repeat a metal cutting or abrading operation on a single article.

A further object is to provide a tool guide-locator which, in combination with a rotary machine tool spindle, is an accurate supplemental spindle which corrects inaccuracies in the rotary machine tool spindle without modification of the machine tool.

These and other objects and advantages will be more clearly understood from the following detailed description and examples as well as from the drawings, all of which are meant to be typical examples and embodiments of rather than any limitations on the scope of the present invention.

In the drawings:

FIG. 1 is a sectional view of one form of the tool guide-locator of the present invention completely carried by the tool;

FIG. 2 is a partially sectional view of another form of the present invention, the body portion of which carries the tool and which imparts to the tool rotating motion;

FIG. 3 is a sectional view of another form of the present invention;

FIG. 4 is another form of the present invention as shown in FIG. 2 including depth stop means; and FIG. 5 is a diagrammatic representation of the present invention in operation on a multi-spindle rotary machine tool functioning both as tool guide-locators and as supplemental spindles.

Briefly, the present invention, in one form, provides a tool guide-locator for a tool used for rotary material removal comprising a body and a locater. The body has a central cavity open at least at one end and aligned along a central axis to receive the tool. The tool guide-locator includes means to secure the body to the tool so as to prohibit any relative movement between the tool and the body. It also includes means to align the tool with the locator. The locator has an inner member and an outer member including an outer locating surface. An anti-friction means such as ball, roller, or needle bearings or other low friction media separates and contacts both the inner and outer members to allow the inner and outer members to be rotatable relative one to the other with respect to the central axis. The outer locating surface of the locator extends radially farther from the central axis than does the body to provide the only contact between the tool guide-locator and an external fixture. The inner member and the body are secured together so that the outer member is rotatable relative to both the inner member and the body with respect to the central axis.

In the partially sectional view of FIG. 1 of the drawing, the tool guide-locator, shown generally at 10, includes a locator 14 and a body 12 through which is secured tool 20 prior to operation. Cutting or metal removing end 20a of the tool projects from the tool guide-locator. The locator portion shown as two ball bearing members 14 in FIG. 1 and elsewhere in the drawing, is preferably and economically in the form of conventional circular bearings secured to body 12 such as by a press fit.

Although a plurality of anti-friction means such as bearings are shown diagrammatically on each of the tool guide-locators in the drawing, it should be understood that only one such bearing need be used according to the present invention. For example, one of the ball bearings 14 in FIG. 1 could be eliminated. However, more accuracy can be achieved in tool location and for functioning as a supplemental spindle in combination with the spindle of a rotary machine tool through division and reduction in locating error using a plurality of bearings which together form the locator.

The locator 14 has an inner member 16 and an outer member 18 having an outer locating surface 22 which in operation contacts liner bushing 24 in the jig or fixture plate 26. The outside diameter of locator 14 normal to central axis 27 is greater than that of the body. Thus the bearing 14, shown diagrammatically in the drawings, has inner and outer members which are rotatable relative one to the other with respect to a central axis 27 which passes through the center of rotary tool 20.

The inner member of the locator is secured to body 12 such as by an interference or press fit. Body 12 includes a central cavity 40 having wall 34, more clearly shown in FIG. 2 to receive and align tool 20 with respect to surface 22 of outer member 18. In FIGS. 1, 2 and 4, the body member includes means such as set screw 28 to secure together the body and the tool. However, a variety of other means such as collets in FIG. 3, threaded tools, snap locks and the like can be used.

In the operation of the arrangement shown in FIG. 1, tool 20 is held in a chuck, collet or other holding fixture in an ordinary spindle of a rotary machine tool such as a drilling machine, milling machine, lathe, etc. Because body 12 is secured to tool 20 such as by set screw 28 and because locator 14 as a unit is secured to the body through inner members 16, the tool and tool guide-locator both are rotated by the machine tool prior to contact with any external part or fixture such as with liner bushing 24. As the tool and the tool guide-locator are fed together toward workpiece 30 in the arrangement of FIG. 1, outer surface 22 of bearing 14 closest to the tool tip 20a first makes friction contact with liner bushing 24 in jig or fixture plate 26 and outer member 18 stops rotating. Body 12 and inner member 16 continue to rotate with tool 20 through the anti-friction means such as balls 32 in the bearing shown diagrammatically in the drawing.

Outer surface 22 of the locator 14 together with inner surface 34, FIGS. 2 and 3, of the body 12 are designed to provide location of the tool 20 with respect to the workpiece 30, in cooperation with internal guide surface such as surface 36 or liner bushing 24. Thus, the guided and located tool 20 abrades or cuts only the workpiece and not the liner bushing 24 nor surface 34 of the tool guide-locator 10. Furthermore, vibration and any sloppy condition of the rotary machine tool spindle is corrected without tool abrasion or damage and without modification of the basic machine. Only a very slight amount of wear occurs between surface 22 of the locator 14 and surface 36 of the liner bushing 24 because very little friction is required between such surfaces to stop rotation of outer member 18. The wear observed on the outer surface 22 in operation indicates that the locator bearing, the life of which is about 4000 hours, would fail before wear on surface 22 would be sufficient to require the locator to be removed from service.

Through the use of the form of the invention shown in FIG. 2, a shorter tool can be used. This is particularly significant in the application and purchase of carbide tools because cost of the tool is reduced by the shorter length required and tool vibration is decreased due to shorter length and minimum extension. At the same time, the tool is protected from chipping and undue wear through contact with parts other than the workpiece. In the arrangement of FIG. 2, the body includes member 12a and a supplementary body spacer 12b which can be presssed onto member 12a after the uppermost member or bearing of locator 14 is in place. In this arrangement, the shank or tang 12c can be made in a variety of shapes and sizes with various attachments and arrangements, such as a tapped hole to fit whatever type spindle is used on the rotary machine tool which rotates and feeds the tool. In FIG. 2, the central cavity 40 terminates within the body rather than extending completely through the body as in the arrangement of FIG. 1. If desirable, an adjustment screw 42 can be inserted into the body member to adjust the penetration of tool 20 into the central opening 40.

In the arrangement of FIG. 2, cavity 40 can be tapped and tool 20 can be threaded on end 21 or attached to a threaded member to allow tool 20 to be secured in cavity 40 without use of set screw 28. Frequently in production, tools are brazed to bolts which, in turn are threaded into a spindle. These kinds of tools are commonly referred to as having "aircraft shanks."

FIG. 3 is a sectional view of another form of the present invention including collets 50a and 50b threaded into body 12. Tool 20 is shown to pass through both collets, similar to the arrangement of FIG. 1, to be inserted in the spindle of a rotary machine tool. However, if desirable, collet 50a can be used to hold tool 20 and collet 50b can be used to hold a tang. In the arrangement of FIG. 3, tool 20 is secured by collets 50a and 50b to the body 12 which in turn is pressed against locator 14 thus securing the unit together. Although locator 14 in FIG. 3 is shown diagrammatically as a double row ball bearing, it should be understood that a variety of anti-friction means can be used, for example, roller bearings, needle bearings or an anti-friction medium to allow inner member 16, body 12 and tool 20 to rotate with respect to outer member 18, with a minimum of friction between member 16 and 18.

It will be appreciated that a single collet such as 50a in FIG. 3 can be used. Similarly, a single collet such as 50a can be used in the form of the invention shown in FIG. 2 or either 50a or 50b in the arrangement of FIG. 1, to replace set screw 28. Interchangeable collets of various internal diameters depending on the tool with which it is to be used can be used to secure tool 20 to body 12. This allows the use of a single tool guide-locator for a variety of kinds and sizes of tools. In addition, the collet's central hole can be made blind to act as a stop for the tool.

The present invention can be provided with a depth stop to control the penetration of tool 20 into workpiece 30. One such arrangement is shown in FIG. 4. A depth stop, shown generally at 60 and having a non-rotating stop arrangement, includes a bearing retainer 62 holding a ball bearing stop 64. Lock collar 66 can be provided to prevent axial movement of the stop bearing retainer 62. Both bearing retainer 62 and lock collar 66 are provided with openings for locking rods 68 to secure the bearing retainer 62 and lock collar 66 to body portion 12a. In the arrangement of FIG. 4, a spacer 52 can be used between tool 20 and adjustment screw 42. The depth stop can be provided with graduated markings for ease and accuracy of depth adjustment.

In the operation of this non-rotating type depth stop, the proper depth adjustment is first made. As the tool guide-locator is fed toward workpiece 30, through liner bushing 24 in the manner previously described, surface 70 of the lower member 75 of ball bearing stop 64 contacts surface 72 of liner bushing 24. Because of the friction of this contact, lower member 75 ceases to rotate with the body member 12a. However, top member 74 and bearing retainer 62 continue to rotate with the tool and the internal portions of the tool guide-locator.

In FIG. 5, a plurality of the tool guide-locators 10 are mounted in combination with the standard spindles 82 of a single rotary machine tool, shown generally at 80, having a turret 44 for a multiple operation on a single workpiece 30. The details of machine 80 and of spindles 82 are not shown because such machines and spindles are well known in the art and commercially available in a number of forms. All of the tool guide-locators 10 can be and are shown as having the same outer diameter so that they can all be used with the single liner bushing 24 even though tools 20d, 20e, 20f, and 20g are of different sizes and lengths and perform different operations on workpiece 30.

Through the use of the present invention, it is not necessary, as would be the case with known tool guides and tool locators mounted within liner bushing 24 in jig or fixture plate 26, to change tool guide-locators or liner bushings with the use of each different kind or size of tool. Furthermore, the working end of the tool contacts only the workpiece and not the tool guide-locator or the liner bushing, thus reducing the wear on the tool and limiting wear to that which occurs as a result of the tool abrading or cutting the workpiece. In addition, chips or fragments removed from workpiece 30 are not carried by the tool through the tool guide-locator as they would be with known apparatus through which the tool moves in operation. Wear and abrasion on the tool guide-locator through such chips and fragments is eliminated by this invention.

As can be recognized particularly from FIG. 5, there is no limit as to size for the tool guide-locator 10. Therefore, one tool guide-locator can accommodate a variety of sizes and kinds of tools. One way this can be accomplished is through the use of collets shown in FIG. 3 or a collet used in connection with the form of the invention shown in FIG. 2 in the event it is desirable to have a universal sized cavity 40.

If the tool guide-locator of the present invention is made very accurately, many of the tools which now must be made with extreme accuracy because of wear and vibration problems, can be made within normal standard tolerances and hence their cost can be reduced. Because tools tend to wear and break, the use of the present invention can result in substantial cost reduction both in the use of standard tools and particularly in connection with the use of carbide tools. Since the present invention acts as its own bushing, no bushing inserts such as the slip renewable bushings now widely used in production need be used. Chipping and "chewing" of the bushing by entry of high speed rotary tools is eliminated.

In production, one tool guide-locator of the present invention can replace up to 50 or more slip renewable bushings in a jig plate or fixture. This eliminates the need for replacing such bushings on the daily, weekly or monthly basis now common in production because of wear or "chewing" by the tool penetration.

The proper combination of the present invention with a liner bushing can result in extreme location accuracy for long periods of time with little or no maintenance required. One of the greatest causes of tool breakage is loose, worn or "sloppy" machine tool spindles. The present invention eliminates such inaccuracy without any repairs to the basic machine. In this respect, the present invention acts as a supplementary rotary machine tool spindle in the combination of the jig and the tool guide-locator.

Although the present invention has been described in connection with some specific examples and embodiments, it will be understood by those skilled in the art, the modifications and variations of which the present invention is capable.

What is claimed is:
1. In combination,
   a tool guide-locator to be secured with a rotary tool used for material removal; and
   a jig having an internal guide surface;
   the tool guide-locator comprising:
   (a) a body having inner walls defining a central tool receiving and aligning cavity open at least at one end, the cavity aligned along a central axis;
   (b) means to secure together the body and the tool to prohibit any relative movement between the tool and the body;
   (c) a locator for positioning the tool laterally with respect to the central axis, the locator
      (1) having an inner member, an outer member including an outer locating surface and an anti-friction means separating and contacting both inner and outer members,
      (2) the inner and outer members being rotatable about the central axis relative one to the other through the anti-friction means,
      (3) the outer locating surface being parallel to the central axis and extending radially farther from the central axis than does the body and engaging the internal guide surface of the jig, and
   (d) means to secure together the body and the inner member so that the outer member is rotatable relative to both the inner member and the body around the central axis.

2. The combination of claim 1 in which the locator is an anti-friction bearing.

3. The combination of claim 1 in which the locator consists of a plurality of anti-friction bearings.

4. The combination of claim 1 in which the means to secure together the body and the tool to prohibit relative movement between the tool and the body is a collet means.

5. The combination of claim 1 in which the tool guide-locator includes, in addition, depth stop means connected with the body and extending radially farther from the central axis than does the outer locating surface of the outer member.

6. The combination of claim 1 in which the body of the tool guide-locator comprises:
   (1) inner walls defining a central tool receiving and aligning cavity open only at one end, the cavity aligned along a central axis, and
   (2) a tang aligned along the central axis on an end of the body opposite the open end of the cavity,
whereby the tool guide-locator acts in addition as a tool holder for the rotary tool used for material removal.

7. The combination of claim 6 in which the locator consists of a plurality of anti-friction bearings.

8. In combination,
a rotary machine tool spindle;
a supplementary spindle to be secured with a rotary tool used for material removal;
means to connect the spindle with the supplementary spindle for combined rotation; and
a jig having an internal guide surface;
   the supplementary spindle comprising:
   (a) a body having inner walls defining a central tool receiving and aligning cavity open at least at one end, the cavity aligned along a central axis;
   (b) means to secure together the body and the tool to prohibit any relative movement between the body and the tool;
   (c) a locator for positioning the tool laterally with respect to the central axis, the locator
      (1) having an inner member, an outer member including an outer locating surface and an anti-friction means separating and contacting both inner and outer members,
      (2) the inner and outer members being rotatable about the central axis one to the other through the anti-friction means,
      (3) the outer locating surface being parallel to the central axis and extending radially farther from the central axis than does the body and engaging the internal guide surface of the jig, and (d) means to secure together the body and the inner member so that the outer member is rotatable relative to both the inner member and the body around the central axis.

9. The combination of claim 8 in which the body of the supplementary spindle comprises:
(1) inner walls defining a central tool receiving and aligning cavity open only at one end, the cavity aligned along a central axis, and
(2) a tang aligned along the central axis on an end of the body opposite the open end of the cavity, the tang connecting the spindle with the supplementary spindle for combined rotation.

10. The combination of claim 8 in which the locator is an anti-friction bearing.

References Cited by the Examiner

UNITED STATES PATENTS

| | | | |
|---|---|---|---|
| 2,477,891 | 8/1949 | O'Neill | 77—55 |
| 3,143,902 | 8/1964 | Turner | 77—55 |

FOREIGN PATENTS 700,269   12/1940   Germany.

FRANCIS S. HUSAR, *Primary Examiner.*